United States Patent [19]

Dieterich et al.

[11] 4,052,347

[45] Oct. 4, 1977

[54] INORGANIC-ORGANIC COMPOSITIONS

[75] Inventors: Dieter Dieterich; Peter Markusch, both of Leverkusen, Germany

[73] Assignee: Bayer Aktiengesellschaft, Leverkusen, Germany

[21] Appl. No.: 469,254

[22] Filed: May 13, 1974

[30] Foreign Application Priority Data

May 17, 1973 Germany .................. 2325090

[51] Int. Cl.$^2$ .............. C08G 18/12; C08G 18/14; C08K 3/34
[52] U.S. Cl. .............. 260/2.5 AK; 260/2.5 AD; 260/37 N
[58] Field of Search ........ 260/2.5 AK, 37 N, 2.5 AD

[56] References Cited

U.S. PATENT DOCUMENTS

| 1,999,382 | 4/1935 | Weygandt | 264/65 |
|---|---|---|---|
| 2,946,112 | 7/1960 | Tucker | 264/63 |
| 3,607,794 | 9/1971 | Abbotson | 260/2.5 AK |
| 3,812,618 | 5/1974 | Wood | 260/2.5 AK |
| 3,812,619 | 5/1974 | Wood | 260/2.5 AK |
| 3,833,386 | 9/1974 | Wood | 260/2.5 AK |
| 3,975,316 | 8/1976 | Villa | 260/2.5 AK |

FOREIGN PATENT DOCUMENTS 1,137,465   12/1968   United Kingdom .......... 260/2.5 AK

*Primary Examiner*—C. Warren Ivy
*Attorney, Agent, or Firm*—Gene Harsh; Joseph C. Gil

[57] ABSTRACT

Inorganic-organic compositions obtained from a mixture of compounds comprising:
  a. from 2–95% by weight of an aqueous alkali metal silicate solution; and containing about 20–70% by weight of said alkali metal silicate and,
  b. from 5–98% by weight of an organic nonionic hydrophilic polyisocyanate.

A water-binding material such as hydraulic cement may be included in the reaction mixture. The products of the invention may be used in many forms including both porous and non-porous products as surface coatings having good adhesion and resistance to abrasion, as a mortar, and as a foam concrete for making molded products particularly in construction engineering and civil engineering as for building walls, igloos, road building and the like. Products are especially useful as lightweight thermal insulating materials with excellent mechanical properties and fire-resistance.

27 Claims, No Drawings

INORGANIC-ORGANIC COMPOSITIONS

This invention relates generally to synthetic materials and more particularly to an improved inorganic-organic material formed, generally speaking, by reacting an organic polyisocyanate with an aqueous solution of an alkali metal silicate optionally also with a water-binding component present.

It is known that polyurethane or polyurea plastics can be produced from organic polyisocyanates and compounds containing active hydrogen atoms which react with -NCO groups. The properties of this class of polymers vary widely. High strength, elasticity and abrasion resistance are particularly valuable properties of these products. On the other hand, their heat stability and in particular their permanent dimensional stability at temperatures above 120° C are only moderate. The use of these products as building and structural elements is limited on account of their unfavorable flame resistance. Although their flame resistance can be improved through the incorporation of flame proofing agents, their mechanical properties are generally adversely affected in this way.

It is also known that inorganic silica-gel materials can be prepared from aqueous solutions of alkali silicates by the action of acids or precursors of acids such as anhydrides. Materials of this kind have acquired particular significance as adhesives, surface-coatings and the like. Lightweight foams have also been produced on the basis of water glass. Products such as those show high dimensional stability under heat and are completely non-inflammable. However, they are brittle and of fairly limited strength. As foams they have no real load-bearing capability and crumble under pressure. It would be extremely desirable to combine with one another the favorable properties of the inorganic materials and of organic plastics materials and to eliminate the undesirable properties of both.

Accordingly, there has been no shortage of attempts to produce composite plastics although none of these attempts has ever reached the required objective.

For example, polyurethanes have been mixed with active silica as a filler and subsequently the resulting mixture has been vulcanized as in U.S. Pat. No. 3,395,129. There are some signs in this case of a strengthening effect, as in cases where highly active carbon black is used. The tensile strength and the modulus increase while the breaking elongation decreases. However, the basic property spectrum of the material is not affected by the use of silica, probably because there is a two-phase system in which only the polyurethane forms a coherent phase while the silica is incorporated therein as an incoherent phase. The incoherent zones have diameters of the order of 3 to 100 microns. Accordingly, the known two-phase systems are relatively coarse, heterogeneous two-phase systems. The interaction between the two phases is very limited both on account of the relatively small interface and because of the very different chemical nature of the two phases.

It is also known to use silica in plastics in the form of microfibers. In this case, the strengthening effect increases by virtue of the specific structure although, on the other hand, the incoherent phase inevitably become larger so that the chemical interaction between the two phases decreases. But none of the foregoing alters the coarse heterogeneous two-phase character of the plastic.

In addition, it has been proposed in U.S. Pat. No. 3,607,794 to react an aqueous solution of an alkali silicate with a monomeric polyisocyanate, for example, 4,4'-diphenylmehane diisocyanate. In most cases, this reaction gives foams in which the isocyanate phase reacts with the water and the carbon dioxide formed foams the mass, some of the carbon dioxide reacting only with the immediately adjacent aqueous silicate phase to give some gel formation but inadequate penetration to give complete uniform gelling.

The reaction is preferably carried out with a predominant quantity of waterglass so that a mixture is formed which is an emulsion of the isocyanate in a coherent silicate solution. Accordingly, the resulting foam is in character a silicate foam which contains incoherent foamed polyurea zones. The properties of a foam of this kind are not really any different from those of a pure silicate foam. In fact, foams produced in this way have the disadvantage of being generally highly water retentive, brittle and of insufficient mechanical strength for their gross density to be suitable for use as construction materials for example, foam concrete.

Although the organic polyisocyanate which is added to the silicate solution acts as hardener, it has little effect upon the properties of the foam formed. Any effect it may have is frequently a negative effect. Obviously, in the final product the organic portion is present substantially as a filler in the completed silicate skeleton.

On the other hand, when an excess of polyisocyanate is used in the process of U.S. Pat. No. 3,607,794 polyurea foams containing a dispersed incoherent silicate phase are obtained. Accordingly, the properties are substantially those of a silica-filled polyurea foam with high flammability and extreme brittleness.

If the teaching of U.S. Pat. No. 3,607,794 is followed, it can be seen that mixtures of aqueous silicate solution and oganic polyisocyanates form only relatively coarse-particle emulsions. Although his disadvantage can be reduced to a large extent by the recommended use of surfactants which make the primary emulsions more finely divided and stable, the property spectrum still remains unsatisfactory. While the surfactants effect a reduction in particle size, the use of surfactants leads to poor compression strength in the final products. In particular, composite materials obtained show pronounced brittleness and limited compression strength. It must be concluded from the results hitherto obtained that composite foams of silicates and organic materials do not have any decisive advantages over pure organic or pure inorganic materials.

It has been also proposed in French Pat. Nos. 1,362,003 and 1,419,552 to use polyisocyanates, alkali metal silicates and polyether or polyester resins to make foams but the resulting rigid products, like those produced in accordance with U.S. Pat. No. 3,607,794 are brittle and have low compression strength. Flexible products made in accordance with these French patents have poor tensile strength.

It is also known that aggregates can be produced from mineral granules and synthetic resins. Processes for producing synthetic resin concrete from porous mineral materials and mixtures which are capable of foaming are known in the art (German Auslegeschrift No. 1,239,229).

In these cases, the mineral material is always included within and bonded together by synthetic resin. Synthetic resin concretes produced in this way have, however, the disadvantages of not being homogeneous so that they are subjected to different degrees of mechanical stress in different zones. Moreover, it is often necessary to use considerable quantities of more than about 30% by weight of an organic synthetic resin which is not only expensive but which also, in most cases, reduces the flame resistance.

It is already known that concrete conventionally used for building purposes can be diluted by the addition of organic porous synthetic resins such as foamed polystyrene and it is also known to add blowing agents such as air to concrete mixtures or to produce gases in situ by adding, for example, aluminum which evolves hydrogen by reactions with the water-cement mixture, in order to obtain porous materials with low gross densities.

The disadvantages of those substantially inorganic materials are relatively long setting times, their relatively high brittleness and their low thermal insulation, compared with organic foam structures.

It is also known to produce structural elements from porous organic synthetic resins with solid, fire-resistant covering layers which are in most cases inorganic or metallic.

Owing to their organic nature, these materials have the disadvantage that they cannot be used as building materials without fire-retarding covering layers.

It is also known to produce cement masses from hydraulic cement, a non-aqueous silica filler such as sand and an organic compound which contains a plurality of isocyanate groups (German Offenlegungsschrift No. 1,924,468). The main disadvantages of these porous cement masses is that they still have comparatively long setting times of 5-6 hours and poor thermal insulation properties.

Heat-resistant foams can be obtained from thermoplastic synthetic resins which can be foamed or are already cellular by working them up in the presence of aqueous alkali metal silicate solutions (German Auslegeschrift No. 1,494,955). The disadvantages of this process are the large heat supply required to foam the thermoplastic resin, the problem of hardening the alkali metal silicate solutions and the water content of the resulting composite material.

It is an object of the invention to provide improved inorganic-organic compositions which are devoid of the foregoing disadvantages. Another object of the invention is to provide inorganic-organic compositions of high strength, rebound elasticity and dimensional stability even at high temperatures which are substantially non-inflammable.

A more specific object of the invention is to obviate the above described disadvantages of known foam materials and to produce an organic-inorganic foam material which combines the advantages of rapid setting times, high compression strength compared to the gross density, high thermal and acoustic insulation, high-flame resistance and excellent resistance to fire.

A still more specific object of the invention is to provide improved thermal and acoustic insulation materials from cheap and readily available raw materials which have low densities of between 8 kp/m$^3$-80 kp/m$^3$, high flame-resistance and low smoke density when exposed to fire.

The foregoing objects and other which will become apparent from the following description are accomplished in accordance with the invention, generally speaking, by providing an inorganic-organic composition obtained from a mixture of components comprising:

a. from 5-98% by weight of an organic, non-ionic hydrophilic polyisocyanate, and
b. from 2-95% by weight of an aqueous alkali metal silicate solution containing about 20-70% by weight of said alkali metal silicate, based on the total weight of (a) and (b).

Thus, a product and process, therefore, has now been found by which it is possible to produce macroscopically completely homogeneous inorganic-organic compositions which are xerosol materials of the solid/solid type, similar to the known ABS-plastics, in their colloidal nature, but have entirely different properties. Xerosols are dispersions of solid or liquid materials in a coherent solid. The completely new composite materials obtained in this way are extremely high-quality compositions which are advantageously distinguished in their properties from pure organic or pure inorganic materials. They are distinguished in particular, by high strength, rebound elasicity, insulating properties, dimensional stability under heat and substantial non-inflammability.

It has surprisingly been found that these inorganic-organic materials of high strength, rebound elasticity, dimensional stability when heated and substantial non-inflammatility can be obtained by homogeneously mixing said polyisocyanate with said aqueous solutions of alkali silicates, if required with an appropriate amount of a water-binding component or filler present, and allowing the sol formed to react to form a xerosol. The colloidal dispersion and mutual penetration of the two phases is belived to be an essential criteria, making possible high specific surface and interfacial interactions such as are characteristic of xerosols. Best properties are obtained with the organic phase being continuous.

The invention also contemplates an improvement in the flame resistance even beyond that which is possible with only components (a) and (b) as set forth above. Thus when only (a) and (b) are combined a product is obtained which is not entirely stable in a fire. Under a direct flame, the waterglass has a tendency to exude from the material and even to melt and fall out of the composition so that the supporting inorganic structure is completely lost.

It is also a feature of the invention that by adding a halogen or phosphorus containing compound one can improve the flame resistance of inorganic portions of the material. It is also an advantage of the invention that the added components have no detrimental effect on the product but they do react at temperatures above about 400° C to form a reaction product with the sodium carbonate with the evolution of carbon dioxide which helps to extinguish the flame. In many instances other compounds including e.g. sodium choride, sodium bromide, sodium phosphate and the like result, and these compounds cannot react further with the silica dioxide, so the product remains very resistant to flame. Thus, when this particular embodiment is used one obtains products suitable for the production for, for example, the wall of building, that has greatly enhanced burn through resistance; that is when a flame is directed to the broad side of a wall, immediately further flame resistant reaction products result from a high temperature reaction of the halogen or phosphorus compound with the sodium carbonate to not only extinguish the flame, but also to prevent further flame spread.

We are not certain of the mechanism of the invention but is is apparent that products without the added halogen or phosphorus containing compound suffer from a reaction between the sodium carbonate formed during the process with the silica dioxide so that waterglass which has a very low melting point is reformed. The resulting composition has poor compression strength and dimensional stability in a fire. On the contrary, a product with vastly improved compression strength and dimensional stability is obtained with the added halogen or phosphorus containing compound.

Further, with the added halogen or phosphorus in even very intense heat so that the organic phase is completely consumed, there remains a fire resistant self-supporting inorganic foam. Also there is no evolution of toxic gases such as, HCl or HBr because other non-toxic products such as, NaCl or NaBr are formed.

Suitable flame resistant compounds which contain halogen or phosphorus are e.g. tributylphosphate, tris-(2,3-dichloropropyl)-phosphate, polyoxypropylene-chloromethylphosphonate, cresyldiphenylphosphate, tricresylphosphate, tris-(β-chloroethyl)-phosphate, tris-(2,3-dichloropropyl)-phosphate, triphenylphosphate, ammoniumphosphate, perchlorinated diphenyl, perchlorinated terephenyl, hexabromocyclodecane, tribromophenol, dibromopropyldiene, hexabromobenzene, octabromodiphenylether, pentabromotoluol, poly-tribromostyrol, tris-(bromocresyl)-phosphate, tetrabromobisphenol A, tetrabromophthalic acid anhydride, octabromodiphenyl, tris-(dibromopropyl)-phosphate, calcium hydrogen phosphate, sodium or potassium dihydrogen phosphate, disodium or dipotassium hydrogenphosphate, ammoniumchloride, phosphoric acid, polyvinylchloride telomers, chloroparaffins as well as further phosphorus and/or halogen containing flame resistant compounds as they are described e.g. in "Kunststoff-Handbuch," Volume VII, Munich 1966, pages 110–111 which is incorporated herein by reference. The organic halogen containing components are, however, preferred.

By using the organic polyisocyanate containing non-ionic hydrophilic groups including, for example, isocyanato prepolymers i.e., polyurea polymer precursors containing non-ionic hydrophilic groups, it is possible to obtain such a homogeneous dispersion of the organic and aqueous inorganic phases that sols are formed in which the disperse phase is present in dimensions of from about 20 nanometers (nm) to 2 microns, preferably from 50 nm to 700 nm, so that the chemical interactions increase by orders of magnitude and novel composite materials are obtained. In particular, it is also possible by using the polyisocyanates containing non-ionic hydrophilic groups to obtain a colloidal fiber structure so that both phases can be present as coherent systems. This means that a macroscopically and, in many cases, even a microscopically homogeneous composite material is obtained which combines the advantages of inorganic and organic compositions.

Accordingly, the present invention also relates to a process for the production of said inorganic-organic compositions compositions of high strength, rebound elasticity, dimension stability even when hot and substantial non-inflammability which is a polyurea-polysilicic acid gel composite material in the form of a colloidal xerosol, wherein an aqueous silicate solution is combined with a. an organic non-ionic, hydrophilic polyisocyanate, b. a water-binding component (i.e. another compound which hardens the water-soluble silicates), in the amounts and with proviso set forth above, and c. optionally further auxiliaries and additives, and the system thus obtained is allowed to react to completion.

The non-ionic-hydrophilic isocyanates which are used for the process according to the invention may be prepared by known methods, e.g. by reacting organic hydroxyl compounds which have a molecular weight of about 400 to about 5000, in particular mono- or polyhydroxyl polyethers, optionally mixed with polyhydric alcohols which have a molecular weight below about 400, with an excess of organic polyisocyanate.

Any suitable organic polyisocyanate may be used. The average molecular weight of the organic polyisocyanate should preferably be between 300 and 8000 (most preferably between 400 and 5000). Suitable polyisocyanates include aliphatic, cycloaliphatic, araliphatic, aromatic or heterocyclic polyisocyanates such as those described e.g. by W. Siefken in Justus Liebigs Annalen der Chemie, 562, pages 75 to 136, for example, ethylene diisocyanate; tetramethylene-1,4-diisocyanate; hexamethylene-1,6-diisocyanate; dodecane-1,12-diisocyanate; cyclobutane-1,3-diisocyanate; cyclohexane-1,3- and 1,4-diisocyanate and any mixtures of these isomers; 1-isocyanato-3,3,5-trimethyl-5-isocyanatomethyl-cyclohexane (German Auslegeschrift No. 1,202,785); hexahydrotolylene-2,4- and -2,6-diisocyanate and any mixtures of these isomers; hexahydrophenylene-1,3- and/or 1,4-diisocyanate, perhydrodiphenylmethane-2,4'- and/or -4,4'-diisocyanate; phenylene-1,3- and -1,4-diisocyanate; tolylene-2,4- and -2,6-diisocyanate and any mixtures of these isomers; diphenylmethane-2,4'- and/or -4,4'-diisocyanate; naphthylene-1,5-diisocyanate; triphenylmethane-4,4',4"-triisocyanate; polyphenyl-polymethylene-polyisocyanates which may be obtained by aniline-formaldehyde condensation followed by phosgenation and which have been described e.g. in British Pat. Specification Nos. 874,430 and 848,671; perchlorinated aryl polyisocyanates such as those described e.g. in German Auslegeschrift No. 1,157,601; polyisocyanates which contain carbodiimide groups as described in German Patent Specification No. 1,092,007; the diisocyanates described in U.S. Pat. Specification No. 3,492,330, polyisocyanates which contain allophanate groups as described e.g. in British Pat. Specification No. 994,890; Belgian Pat. Specification No. 761,626 and published Dutch Pat. application No. 7,102,524; polyisocyanates which contain isocyanurate groups as described e.g. in German Pat. Specification Nos. 1,022,789; 1,222,067 and 1,027,394 and in German Offenlegungsschriften Nos. 1,929,034 and 2,004,048; polyisocyanates which contain urethane groups as described e.g. in Belgian Pat. Specification No. 752,261 or in U.S. Pat. Specification No. 3,394,164; polyisocyanates which contain acylated urea groups in accordance with German Pat. Specification No. 1,230,778; polyisocyanates which contain biuret groups as described e.g. in German Pat. Specification No. 1,101,394; in British Pat. Specification No. 889,050 and in French Pat. Specification No. 7,017,514; polyisocyanates prepared by telomerization reactions as described e.g. in Belgian Pat. Specification No. 723,640; polyisocyanates which contain ester groups as described e.g. in British Pat. Specification Nos. 965,474 and 1,072,956; in U.S. Pat. Specification No. 3,567,763 and in German Pat. Specification No. 1,231,688 and reaction products of the above mentioned isocyanates with acetals in accordance with German Pat. Specification No. 1,072,385.

The distillation residues which still contain isocyanate groups obtained from the commercial production of isocyanates are preferred, and may be dissolved in one or more of the above mentioned polyisocyanates. Any mixtures of the above mentioned polyisocyanates may also be used.

It is generally preferred to use commercially readily available polyisocyanates such as polyphenyl-polymethylene-polyisocyanates obtained by aniline-formaldehyde condensation followed by phosgenation ("crude MDI") and polyisocyanates which contain carbodiimide groups, urethane groups, allophanate groups, isocyanurate groups, urea groups or biuret groups ("modified polyisocyanates").

The isocyanate group can also be present in masked form, for example, as a uretdione or caprolactam adduct. The polyisocyanates used in the process according to the invention preferably contain from about 2 to 10 more preferably from 2.2 to 4 isocyanato groups.

Suitable organic polyisocyanates also include prepolymers obtained by the so-called isocyanate-polyaddition process of the kind which have been repeatedly described over recent years. It is no problem to control virtually any known isocyanate reaction so that it can be stopped at least temporarily at a prepolymer stage. The prepolymers include not only adducts of polyisocyanates with alcohols, mercaptans, carboxylic acids, amines, ureas and amides, but also reaction products of the foregoing polyisocyanates with themselves, such as, uretdiones, isocyanurates, carbodiimides which can readily be obtained from monomeric polyisocyanates with an increase in molecular weight.

NCO-prepolymers particularly suitable for the process according to the invention are prepared by methods known per se, for example, by reacting polyhydroxyl compounds with a molecular weight of from about 400 to 5000, more especially polyhydroxyl polyesters and polyhydroxypolyethers, if desired in admixture with polyhydric alcohols with a molecular weight of less than 400, with excess quantities of polyisocyanates, for example, hexamethylene diisocyanate, 2,4-tolylene diisocyanate, 2,6-tolylene diisocyanate, 4,4'-diisocyanatodiphenylmethane, etc.

Non-ionic hydrophilic modification of the prepolymer may be achieved, for example, by reacting a polyisocyanate with a hydrophilic polyether which contains groups which are reactive with isocyanate groups or with a siloxane compound which contains hydrogen atoms which are reactive with isocyanate groups. Polyethers which have been synthesized from alcohols with a functionality of 1 to 3 and ethylene oxide and/or propylene oxide and which contain terminal OH groups are preferred although other compounds containing polyether or polyether groups which have been prepared by different methods, may of course, be used in preparing the prepolymer provided such compounds contain hydrophilic groups. It is particularly preferred to use monofunctional polyethers based on monoalcohols with a molecular weight of about 32 to about 300 ethylene oxide because the non-ionic hydrophilic prepolymers prepared from these starting materials generally have a viscosity of less than 50,000 cP, which is advantageous for working up, and preferably less than 10,000 cP.

The reaction products of the above mentioned polyisocyanates with aliphatic polycarbonates which contain hydrogen atoms which are reactive with isocyanate groups are also suitable prepolymers for the purpose of the invention. Examples of such prepolymers are polycarbonates based on ethylene glycol, propylene glycol or tetraethylene glycol. Prepolymers which contain a hydrophilic polyether segment, e.g. of triethylene glycol or diethylene glycol and succinic acid or oxalic acid are also suitable. These segments may be destroyed in the course of the subsequent reaction with waterglass in which the inorganic component hardens and the organic component becomes hydrophobic.

The hydrophilic center may also be introduced by incorporating a glycol such as triethylene or tetraethylene glycol, preferably in combination with a very hydrophilic isocyanate such as a biuret diisocyanate or biuret triisocyanate.

The hydrophilic groups may be present in the main chain or the side chain of the prepolymer.

In addition to the hydrophilic-non-ionic segment, there may also be an ionic center either in the same or some other molecule. Such ionic-non-ionic combinations enable the morphology and interface chemistry of the two-phase plastics of the invention to be adjusted as desired.

If desired, prepolymers known per se and particularly those based on aromatic isocyanates may also be subsequently reacted by the processes mentioned above to produce non-ionic hydrophilic prepolymers.

Particularly suitable prepolymers which have a high stability in storage can also be obtained by reacting aromatic isocyanates such as tolylene diisocyanate, diphenylmethane diisocyanates and the known phosgenation products of the products of condensation of armoatic monoamines such as aniline and aldehydes such as formaldehyde with hydrophilic polyethers which contain groups which are reactive with isocyanates. These non-ionic hydrophilic polyisocyanates which according to IR spectroscopic analysis in part still contain detectable urea and biuret groups as well as urethane and/or allophanate groups in cases where polyol modification has been carried out are eminently suitable as prepolymers.

The phosgenation products used for non-ionic hydrophilic modification are preferably products of the phosgenation of higher molecular weight aniline/formaldehyde condensation products which have a viscosity at 25° C of about 50 to 10,000 cP, preferably 100–5000 cP.

Reaction products of 50–99 mols of aromatic diisocyanates and 1–50 mols of the usual organic compounds which contain at least two hydrogen atoms capable of reacting with isocyanates and generally have a molecular weight of about 400 to about 10,000 may also be used. Apart from compounds of this kind which contain amino groups, thiol groups or carboxyl groups, these compounds are preferably polyhydroxyl compounds, in particular compounds which contain 2–8 hydroxyl groups, and especially those with a molecular weight of about 800 to about 10,000 preferably about 1000 to about 6000 e.g. polyesters, polyethers, polythioethers, polyacetals, polycarbonates and polyesteramides which contain at least two and generally 2–8 but preferably 2–4 hydroxyl groups of the kind which are known per se for producing both homogeneous and cellular polyurethanes.

Any suitable polyester which contains hydroxyl groups may be used such as, for example, the products obtained by reacting polyhydric alcohols, preferably glycols, with the optional addition of trihydric alcohols, with polybasic, preferably dicarboxylic acids. Instead of free polycarboxylic acids, the corresponding carboxylic acid anhydrides or corresponding polycarboxylic acid esters of lower alcohols or mixtures of these may be used for preparing the polyesters. The polycarboxylic acids may be aliphatic, cycloaliphatic, aromatic and/or heterocyclic and may be substituted e.g. with halogen atoms, and/or unsaturated. The following are given as examples: succinic acid, adipic acid, azelaic acid, suberic acid, sebacic acid, phthalic acid, isophthalic acid, trimellitic acid, phthalic acid anhydride, tetrahydrophthalic acid anhydride, hexahydrophthalic acid anhydride, tetrachlorophthalic acid anhydride, endomethylene tetrahydrophthalic acid anhydride, glutaric acid anhydride, maleic acid, maleic acid anhydride, fumaric acid, dimeric and trimeric fatty acids such as oleic acid, optionally mixed with monomeric fatty acids, dimethylterephthalate and diethylene terephthalate. Any suitable polyhydric alcohol may be used such as, for example, ethylene glycol, propylene-1,2- and -1,3-glycol, butylene-1,4- and -2,3-glycol, hexane-1,6-diol, octane-1,8-diol, neopentyl glycol, cyclohexane dimethanol (1,4-bis-hydroxymethylcyclohexane), 2-methyl-propane-1,3-diol, glycerol, trimethylolpropane, hexane-1,2,6-triol, butane-1,2,4-triol, trimethylolethane, pentaerythritol, quinitol, mannitol, and sorbitol, methyl glycoside, diethylene glycol, triethylene glycol, tetraethylene glycol, polyethylene glycols, dipropylene glycol, polypropylene glycols, dibutylene glycol and polybutylene glycols. The polyesters may contain some terminal carboxyl groups. Any suitable polyester of a lactone such as ε-caprolactone or hydroxycarboxylic acids, e.g. ω-hydroxycaproic acid may also be used.

Any suitable polyether which contains at least two and generally 2 to 8, preferably 2 or 3 hydroxyl groups known per se and prepared e.g. by polymerizing epoxides such as, ethylene oxide, propylene oxide, butylene oxide, tetrahydrofuran, styrene oxide or epichlorohydrin, each with itself, e.g. in the presence of $BF_3$, or by a reaction of addition of these epoxides, optionally as mixtures or successively, to starting components which contain reactive hydrogen atoms such as alcohols or amines, e.g. water, ethylene glycol, propylene-1,3- or -1,2-glycol, trimethylolpropane, 4,4'-dihydroxydiphenylpropane, aniline, ammonia, ethanolamine or ethylenediamine may be used. Sucrose polyethers, e.g. those described in German Auslegeschrift Nos. 1,176,358 and 1,064,938 may also be used for the process of the invention. It is frequently preferred to use those polyethers which contain predominately primary OH groups (up to 90% by weight, based on all the OH groups present in the polyether). Polyethers which have been modified with vinyl polymer, e.g. by polymerization with styrene or acrylonitrile in the presence of polyethers (U.S. Pat. Specification Nos. 3,383,351; 3,304,273; 3,523,093; and 3,110,695 and German Pat. Specification No. 1,152,536) and polybutadienes which contain OH groups are also suitable.

Any suitable polythioether may be used including the condensation products of thiodiglycol with itself and/or with other glycols, dicarboxylic acids, formaldehyde, aminocarboxylic acids or amino alcohols. The products obtained are polythio mixed ethers, polythio ether esters or polythioether ester amides, depending on the cocomponent.

Any suitable polyacetal may be used e.g. the compounds obtained from glycols, such as diethylene glycol, triethylene glycol, 4,4'-dioxethoxy-diphenyldimethylmethane, hexanediol and formaldehyde. Polyacetals suitable for the process according to the invention may also be prepared by polymerizing cyclic acetals.

Any suitable hydroxyl polycarbonates of the kind already known per se, may be used such as e.g. those obtained by reacting diols such as propane-1,3-diol, butane-1,4-diol and/or hexane-1,6-diol, diethylene glycol, triethylene glycol or tetraethylene glycol with diaryl carbonates such as diphenylcarbonate or phosgene.

Any suitable polyester amide or polyamides may be used including, for example, the predominately linear condensates which can be obtained from polyvalent saturated and unsaturated carboxylic acids or their anhydrides and polyvalent saturated and unsaturated aminoalcohols, diamines, polyamines and mixtures thereof.

Polyhydroxyl compounds which already contain urethane or urea groups as well as modified or unmodified natural polyols such as castor oil, carbohydrates or starch may also be used. Addition products of alkylene oxides and phenol formaldehyde resins or of alkylene oxides and urea formaldehyde resins may also be used according to the invention.

Representatives of these organic compounds having reactive hydrogen atoms which may be used for the process according to the invention are described e.g. in High Polymers, Vol. XVI, "Polyurethanes, Chemistry and Technology" by Saunders and Frisch, Interscience Publishers, New York, London, Vol. I, 1962, pages 32–42 and pages 44–54 and Vol. II. 1964, pages 5–6 and pages 198–199 and in Kunststoff-Handbuch, Vol. VII, Vieweg-Hochtlen, Carl-Hanser-Verlag, Munich 1966, e.g. on pages 45–71 the disclosures of which are incorporated herein by reference.

The non-ionic hydrophillic center may be introduced by including suitable non-ionic hydrophillic substances or by a subsequent reaction.

The prepolymers obtained by the usual non-ionic hydrophilic modification frequently have a viscosity at 25° C of more than 2000 cP and in some cases up to 100,000 cP or more. In cases where such high viscosities are undesirable for subsequent processes carried out on the product, the viscosity may be lowered to a desirable level by adding low viscosity isocyanates or inert solvents. Furthermore, the length of time of the hardening process may be increased by a combination of such prepolymers with the usual low viscosity isocyanates.

Non-ionic hydrophilic prepolymers which are particularly preferred are obtained by reacting aromatic polyisocyanates with monofunctional hydrophilic polyethers based on alcohols and ethylene oxide with a molecular weight of about 500 to 2000. Prepolymers of this kind can be obtained simply by reacting the aromatic polyisocyanates with the hydrophilic polyethers which contain terminal OH groups at room temperature or at elevated temperatures and they are characterized by containing urethane groups and/or allophanate groups.

The presence of only a low proportion of non-ionic hydrophilic groups is sufficient to insure the desired high degree of compatibility of the non-ionic hydrophilic prepolymers with the aqueous silicate solution. For example, 1% to 2% by weight, based on the prepolymer is sufficient, although the proportion of non-ionic hydrophilic groups is preferably 5% to 25% by weight. In exceptional cases, for example, if the non-ionic hydrophilic prepolymers contain comparatively non-reactive isocyanate groups or other end groups, the proportion of non-ionic hydrophilic groups may be increased to more than 50% by weight.

The prepolymer which has been modified with non-ionic hydrophilic groups may, of course, be prepared just before it is mixed with silicate solution, e.g. conventional hydrophobic prepolymers such as the phosgenation product of an aniline-formaldehyde condensate may be mixed with a hydrophilic polyether which contains OH or NH groups immediately before it is mixed with waterglass.

The reaction with carboxyl groups or with aminocarbamates is also accompanied by the liberation of $CO_2$ which acts as a hardener. Carbon dioxide is also formed if the process is carried out in the presence of catalysts which accelerate carbodiimide formation, such as phospholine oxide. In all these reactions, one advantage of the process of this invention is that the carbonic acid formed in most cases diffuses quantitatively and practically instantly into the aqueous phase where it effects hardening of the silicate solution.

The invention contemplates the use of any suitable aqueous solution of an alkali metal silicate, containing 20-70% by weight of said alkali metal silicate, such as, for example, sodium silicate, potassium silicate or the like. Such aqueous silicates are normally referred to as "waterglass." It is also possible to use crude commercial-grade solutions which can additionally contain, for example, calcium silicate, magnesium silicate, borates and aluminates. The $Me_2O:SiO_2$ ratio is not critical and can vary within the usual limits, preferably amounting to 4–0.2. Me, of course, refers to the alkali metal. Preferably, sodium silicate with a molar ratio of $Na_2O:SiO_2$ between 1:1.6 and 1:3.3 is used. If the water content of the inorganic-organic end product initially obtained by reaction with the organic polyisocyanate is unimportant because it is chemically bound by the water-binding component as it is harmless or because it can readily be removed by drying, it is possible to use neutral sodium silicate from which 20 to 35% by weight solutions can be prepared. However, it is preferred to use 32 to 54% silicate solutions which, only if made sufficiently alkaline, have a viscosity of less than 500 poises at room temperature which is the limit required to insure problem-free processing. Although ammonium silicate solutions can also be used, they are less preferred. The solutions can either be genuine solutions or even colloidal solutions.

The choice of the concentration of the aqueous silicate solution is governed above all by the required end product. Compact or closed-cell materials are preferably prepared with concentrated silicate solutions which, if necessary, are adjusted to low viscosity by the addition of alkali hydroxide. It is possible in this way to prepare 40% to 70% by weight solutions. On the other hand, 20% to 40% by weight silicate solutions are preferably used for the production of open-cell lightweight foams in order to obtain low viscosities, sufficiently long reaction times and low densities. Even in cases where finely divided inorganic fillers are used in relatively large quantities, 20% to 45% by weight silicate solutions are preferred.

It is also possible to make the silicate solution in situ by using a combination of solid alkali metal silicate and water.

Water-binding components which may be used according to the invention include organic or inorganic water-binding substances which have first the ability to chemically combine, preferably irreversibly, with water and second the ability to reinforce the organic-inorganic end products of the invention. The most preferred water-binding agents of the invention, hold the water chemically bound until heated sufficiently, as in a fire. Thus, in a fire the water is released and extinguishes the fire. The term "water-binding component" is used herein to identify a material preferably granular or particulate which is sufficiently anhydrous to be capable of absorbing water to form a solid or gel such as mortar or hydraulic cement. This component mauy be a mineral or chemical compound which is anhydrous, such as CaO and $CaSO_4$ but may exist as a partial hydrate. The water-binding components preferably used are inorganic materials such as hydraulic cements, synthetic anhydrite, gypsum or burnt lime.

Suitable hydraulic cements are in particular Portland cement, quick-setting cement, blast-furnace Portland cement, mild-burnt cement, sulphate-resistant cement, brick cement, natural cement, lime cement, gypsum cement, pozzolan cement and calcium sulphate cement. In general, any mixture of fine ground lime, alumina and silica that will set to a hard product by admixture of water, which combines chemically with the other ingredients to form a hydrate may be used. The most preferred forms of water-binding agents to be used in accordance with the invention are those materials which are normally known as cement. In other words, they are a normally powdered material with which water normally forms a paste which hardens slowly and may be used to bind intermixed crushed rock or gravel and sand into rockhard concrete. There are so many different kinds of cement which can be used in the production of the compositions of the invention and they are so well known that a detailed description of cement will not be given here. However, one can find such a detailed description in *Encyclopedia of Chemical Technology*, Volume 4, Second Edition, Published by Kirk-Othmer, pages 684–710, as well as in other well known references in this field. In particular, pages 685–697 of the aforementioned Volume 4, Second Edition of Kirk-Othmer's Encyclopedia containing a detailed disclosure of the type of cement which may be used in the production of the compositions of this invention are incorporated herein by reference.

Production of the inorganic-organic compositions according to the invention is simple. It is merely necessary for the components to come together, for example, one may mix the organic polyisocyanate with the aqueous alkali silicate solution, after which the mixture generally hardens immediately. The mixtures are typical finely divided emulsions or sols. They are not optically clear, but generally opaque or milky-white. The subsequent xerosol seems to be preformed in them.

Important advantages obtained according to the invention are the short mixing time, which amounts to between 2 seconds and at the most about 5 minutes when the components are mixed by a discontinuous process, and the rapid hardening time, which is generally less than 30 minutes.

In commercial production processes, these advantages can result in short molding times and hence rapid manufacturing cycles.

The mixture of the components, generally is not stable. The so-called "pot lives," during which the mixtures are processible, are governed above all by the amount and reactivity of the organic polyisocyanate and by the concentration of the silicate solution. The "pot life" is between 0.2 seconds and 2 days, it can be adjusted between 0.2 seconds and several hours (i.e., about 4 hours) or it can be between 2 seconds to about 1 hour. In the case of masked isocyanates which do not contain free —NCO groups, it is even possible to achieve pot lives of several hours up to about 2 days. Pot lives of from about 1 second to about 20 minutes are preferred at these times are most often suitable.

It follows from this that combination of the reactive starting materials is generally carried out immediately before forming. The polyurea-silica gel composite materials can be produced by previously known techniques, for example, in the same way as cast or foamed polyurethanes employing for example, a mixer such as is disclosed in U.S. Reissue Pat. No. 24,514. If the water-binding component is also included in the reaction mixture it is preferred to use a mixer such as is conventionally used in the building-construction trade, for example, for making mortar. Thus, a mixer with a large ribbon type blender can be used whereby the three components are simultaneously introduced into the mixer and then shortly after mixing the reacting components are poured onto a surface or into a mold where they are allowed to react to form the inorganic-organic compositions of the invention. Still further it is possible to simply mix the components in a container for example with a relatively low speed mixer as one would use to stir paint and then pour the components into another mold or to allow them to react in the container. It is also possible to use a kneader for the mixing of the components. Still further, one may mix the reacting components in an extruder which has one or more entrance ports so that components may be either simultaneously injected and mixed or they may be separately added to the extruder. For example, a premixture of the alkali metal silicate solution and the organic polyisocyanate may be mixed with the water-binding component or alternately it is possible to insert the three components one at a time into the extruder through separate ports and it is even possible to add an accelerator through a fourth port into the extruder.

It is important, if the water-binding component is present in the reaction mixture, that it be kept separate from the alkali metal silicate solution until it is time to allow the reaction mixture to react to completion. Thus, it is possible to mix the three components; namely, the organic polyisocyanate, the alkali silicate solution, and the water-binding component simultaneously or it is also possible to premix the water-binding component and the organic polyisoycanate component and then add the alkali metal silicate component. It is generally undesirable to mix the water-binding component and the alkali metal silicate component before the organic polyisocyanate is added because this can lead to preliminary solidification of the alkali metal silicate solution. Thus, it is preferred to either simultaneously mix all three of the essential components or first mix the organic polyisocyanate with either the alkali metal silicate solution or the water-binding component and then add the remaining ingredient to the mixture.

The quantitative ratios of the components is not critical in the production of the polyurea silica gel composite material. This is of particular advantage because it means that dosage does not have to be exact even in continuous production through metering devices and mixing chambers. Thus, it is even possible to use heavy-duty metering devices such as gear pumps.

The ratios of the essential reactants which lead to the inorganic-organic compositions of the invention may vary, broadly speaking, within ranges as follows:
 a. from 5–98% by weight of the organic non-ionic hydrophilic polyisocyanate
 b. from 2–95% by weight of an aqueous alkali metal silicate solution containing about 20–70% by weight of said alkali metal silicate based on the total weight of (a) and (b).

Thus, a preferred combination within the scope of the invention involves the reaction of components in the amounts within the following ranges:
 a. 10–80% by weight of said organic non-ionic hydrophilic polyisocyanates, and
 b. 20–90% by weight of said aqueous alkali metal silicate solution.

A still more preferred composition is obtained from components in the following ranges:
 a. 10–50% by weight of said organic polyisocyanates,
 b. 50–90% by weight of said alkali metal silicate solution.

The most preferred ranges of components are as follows:
 a. 20–50% by weight of said organic polyisocyanates,
 b. 50–80% by weight of said alkali metal silicate solution.

The reactants are preferably mixed at room temperature though any suitable temperature in the range of $-20°$ C to $80°$ C may be employed.

The activity of the reaction mixture can be most easily adjusted by adjusting the non-ionic hydrophilic group content.

Products of low silicate content, for example, between 10 and 30% by weight are prepared when it is desired that the organic polymer properties should be predominant. In these products the silicate fraction reacts as a binding substance with the normally inactive fillers such as chalk, heavy spar, gypsum, anhydrite, clay, kaolin and the like.

Small quantities of silicate solutions can also be used in cases where it is required to harden an isocyanate prepolymer with water to form a pore-free homogeneous plastic provided said prepolymer contains non-ionic hydrophilic groups. Since the reaction of NCO-groups with water is known to be accompanied by the evolution of $CO_2$, in the absence of alkali metal silicate water can virtually only be used for the production of foams. In the presence of alkali metal silicate, the $CO_2$ formed is absorbed by the silicate. Thus, even in cases where waterglass solutions are used in standard polyurethane elastomer recipes, it is possible to prevent the formation of pores through liberated $CO_2$. Further, the reaction of organic polyisocyanate containing non-ionic hydrophilic groups with concentrated alkali metal silicate solutions, which may if desired by alkalized, leads to a product with considerably reduced pore formation and, providing the quantitative ratios which can be empirically determined without difficulty are adapted to one another, to a "water-extended" or "water-cross-linked," completely bubble-free matrial. Accordingly, high quality homogenous polyureas can be obtained by a simple, solvent-free direct process. The required reaction velocity can readily be adjusted by varying the non-ionic hydrophilic group content.

According to the invention, foam materials with excellent fire resistance is obtained if the sum of inorganic constituents including fillers is more than 30% by weight by preferably more than 50% by weight, based on the total mixture.

High silicate contents, for example, from 50% to 95% by weight are desirable in cases where the properties of an inorganic silicate material, especially high-temperature stability and relatively complete non-inflammability, are essential requirements. In this case, the function of the organic polyisocyanate is that of a non-volatile hardener whose reaction product is a high molecular weight polymer which reduces the brittleness of the product. By virtue of the elasticizing effect, organic polyisocyanates are superior to the conventional acid-based hardeners. The hardening times generally increase with decreasing ionic group content. However, it is of course, also possible to use organic polyisocyanates, in combination with acid-liberating hardeners. In this case, the reaction products of the organic polyisocyanates with water act mainly as elasticizing components.

Mixtures of organic polyisocyanates and aqueous silicate solutions containing more than 30% by weight of water are preferably used for the production of thin layers, for example, surface coatings or putties, adhesives, caulks and more particularly, for the production of foams. The production of foams is a preferred embodiment of the invention.

In the production of foams by the process according to the invention, it is also advisable to use expanding or blowing agents. Any suitable blowing agent may be used including, for example, inert liquids boiling at temperatures of from $-25°$ to $+50°$ C. The blowing agents preferably have boiling points of from $-15°$ C. to $+40°$ C. The blowing agents are preferbly insoluble in the silicate solution. Particularly suitable blowing agents are alkanes, alkenes, halogen-substituted alkanes and alkenes or dialkyl ethers, such as for example, saturated or unsaturated hydrocarbons with 4 to 5 carbon atoms such as isobutylene, butadiene, isoprene, butane, pentane, petroleum ether, halogenated saturated or unsaturated hydrocarbons such as chloromethyl, methylene chloride, fluorotrichloromethane, difluorodichloromethane, trifluorochloromethane, chloroethane, vinyl chloride, vinylidene chloride. Trichlorofluoromethane, vinyl chloride and $C_4$-hydrocarbons such as butane for example, have proved to be the most suitable.

Thus, any suitable highly volatile inorganic and/or organic substances may be used as a blowing agent, including those listed above. Additional suitable blowing agents are, for example, acetone, ethyl acetate, methanol, ethanol, hexane or diethylether. Foaming can also be achieved by adding compounds which decompose at temperatures above room temperature to liberate gases such as nitrogen for example, azo compounds, such as azoisobutyric acid nitrile. Other examples of blowing agents are included for example, in Kunststoff-Handbuch, Volume VII, published by Vieweg and Hochtlen, Car-Hanser-Verlag, Munich 1966, e.g. on pages 108 and 109, 453 to 445 and 507 to 510; but the water contained in the mixture may also function as blowing agent. Fine metal powders such as powdered calcium, magnesium, aluminum or zinc may also be used as blowing agents since they evolve hydrogen in the presence of waterglass which is sufficiently alkaline and, at the same time, have a hardening and reinforcing effect.

It has been found that blowing agents which contain fluorine such as those listed above exhibit a synergistic effect in that they not only function to foam the reaction mixture but also they have a special effect in that they decrease the surface tension of the organic phase. This is important because it makes it possible to obtain high quality products even with relatively small amounts of polyisocyanates. Furthermore, the use of a fluorine containing blowing agent, such as the chloro fluoro alkanes listed above assists in creating a greater differential between the surface tension of the inorganic phase which is higher and the surface tension of the organic phase.

Thus, the best products of the invention are believed to be the ones where the organic phase is the continuous phase and the inorganic phase is a discontinuous or continuous phase and this may be brought about by the use of an amount of an organic polyisocyanate which is more than 20% by weight of the portion of the composition based on the organic polyisocyanate and the alkali metal silicate, but it can be even less than 20% by weight where one employes a fluorine containing blowing agent because of the lower surface tension of the organic phase which leads to the results pointed out above. In other words, it is possible to get a continuous organic phase with lower amounts of organic polyisocyanate when one uses a fluorine containing blowing agent.

The blowing agents may be used in quantities of from up to 50% by weight and preferably in quantities of from 2 to 10% by weight, based on the reaction mixture.

Foam can, of course, also be produced with the assistance of inert gases, especially air. For example, one of the two reaction components can be prefoamed with air and then mixed with the other. The components can also be mixed for example, by means of compressed air so that foam is directly formed, subsequently hardening in molds.

Other substances, such as the emulsifiers, activators and foam stabilizers normally used in the production of polyurethane foams, can also be added. However, they are generally not necessary. An addition of silanes, polysiloxanes, polyethyer polysiloxanes or silyl-nodified isocyanates; can intensify the interaction between the two phases. Examples of foam stabilizers are disclosed in U.S. Pat. No. 3,201,372 at Column 3, line 46 to Column 4, line 5.

Catalysts are often used in the process according to the invention. The catalysts used may be known per se, e.g. tertiary amines such as triethylamine, tributylamine, N-methyl-morpholine, N-ethyl-morpholine, N-cocomorpholine, N,N,N,', N'-tetramethyl-ethylenediamine, 1,4-diaza-bicyclo-(2,2,2)-octane, N-methyl-N'-dimethylaminoethyl piperazine, N,N,-dimethyl benzylamine, bis-(N,N-diethylaminoethyl)-adipate, N,N-diethyl benzylamine, pentamethyl diethylenetriamine, N,N-dimethyl cyclohexalamine, N,N,N',N'-tetramethyl-1,3-butanediamine, N,N-dimethyl-$\beta$-phenyl ethylamine, 1,2-dimethyl imidazole, 2-methyl imidazole and particularly also hexahydrotriazine derivatives.

The following are examples of tertiary amines containing hydrogen atoms which are reactive with isocyanate groups: triethanolamine, triisopropanolamine, N-methyl-diethanolamine, N-ethyl-diethanolamine, N,N-dimethyl-ethanolamine and their reaction products with alkylene oxides such as propylene oxide and/or ethylene oxide.

Silaamines with carbon-silicon bonds may also be used as catalysts, e.g. those described in German Pat.

Specification No. 1,229,290, for example, 2,2,4-trimethyl-2-silamorpholine or 1,3-diethylaminomethyl-tetramethyldisiloxane.

Bases which contain nitrogen such as tetraalkyl ammoinum hydroxides, alkali metal hydroxides such as sodium hydroxide, alkali metal phenolates such as sodium phenolate or alkali metal alcoholates such as sodium methylate may also be used as catalysts. Hexahydrotriazines are also suitable catalysts.

Organic metal compounds may also be used as catalysts according to the invention, especially organic tin compounds.

The organic tin compounds used are preferably tin (II) salts of carboxylic acids such as tin(II)-acetate, tin(II)-octoate, tin(II)-ethyl hexoate and tin(II)-laurate and the dialkyl tin salts of carboxylic acids such as dibutyl tin diacetate, dibutyl tin dilaurate, dibutyl tin maleate or dioctyl tin diacetate.

Other examples of catalysts which may be used according to the invention and details of the action of the catalysts may be found in Kunststoff-Handbuch, Volume VII, published by Vieweg and Hochtlen, Carl-Hanser-Verlag, Munich 1966, e.g. on pages 96 to 102.

The catalysts are generally used in a quantity of between about 0.001 and 10% by weight, based on the quantity of isocyanate.

Particularly high quality products are obtained by the process according to the invention where hardening is carried out at temperatures above 80° C, more particularly at temperatures of from 100° C to 200° C. Particularly in the case of combinations of organic polyisocyanates with 10% to 40% of NCO-groups and alkali silicate solutions, so much heat is liberated, even in the absence of applied heat, that the water present begins to evaporate. Temperatures up to 130° C are reached inside the foam blocks. The foregoing temperatures are only the preferred ones in the absence of water-binding components. If water-binding components are present then the temperatures are usually lower, in most cases, for instance, between about 40 and about 100° C.

It would seem that particularly pronounced interactions and a particularly intimate bond between inorganic and organic polymer are developed under conditions such as these, resulting in the formation of materials which, on the one hand, are as hard as stone but which on the other hand are highly elastic and, hence, highly resistant to impact and breakage.

If the quantity of heat which is liberated during the reaction between the components is not sufficient to obtain optimum properties, mixing can readily be carried out at elevated temperatures, for example, at temperatures of from 40° C to 100° C. In special cases, mixing can also be carried out under pressure at temperatures above 100° C up to about 150° C in a closed container so that expansion occurs, accompanied by foam formation, as the material issues from the container.

Generally, production of the foams in accordance with the invention is carried out by mixing the described reaction components together either in one stage or in several stages in a batch-type or continuous mixer, and allowing the resulting mixture to foam and harden in molds or on suitable substrates, generally outside the mixer. The necessary reaction temperature amounting to between preferably about 0° C and 200° C and most preferably to between 40° C and 130° C, can either be achieved by preheating one or more reaction components before the mixing process or by heating the mixer itself or by heating the reaction mixture prepared after mixing. Combinations of these or other procedures for adjusting the reaction temperature are of course, also suitable. In most cases, sufficient heat is generated during the reaction itself so that, after the beginning of the reaction or foaming, the reaction temperature can rise to levels about 100° C.

For any given recipe, the properties of the resulting foams, for example, their moist density, is governed to some extent by the parameters of the mixing process, for example, the shape and rotational speed of the stirrer, the shape of the mixing chamber etc., and also be the reaction temperature selected for densities foaming. The moist, fresh foam can have a density of approximately from 0.01 to 1.3 g/cc, although in general the moist fresh foam is obtained with densities of from 0.01 to 0.2 g/cc. The dried foams can have cloeed or open cells, although in most cases they are largely made up of open cells and have densities of from 0.005 to 0.6 g/cc. Where the water-binding component is present, densities of 0.02 and 0.8 g/cc are preferred. Especially preferred are lightweight foams with denisities from 0.01 to 0.2 g/cc.

Lightweight foams having a density from 0.01 to 0.08 are of special interest.

In case of high amounts of inorganic material these foams are combining good flame resistance, insulating, insulating properties and low costs of the starting materials.

Regarding the low density of the foams compression strength is not very high.

A mixture of about equal parts of alkali metal silicate and polyisocyanate or an excess of alkali metal silicate is preferred. Water binding fillers are usually omitted whereas favourably salts of phosphoric acid are added to improve the hardening process of the alkali metal silicate as well as the fire resistance of the foam material.

In combination with expanded clay — in this case the foam material plays the part of a binding agent — high concrete is obtained which can for example be used as panels in the construction field.

By virtue of the behavoir of the reaction mixtures, the process according to the invention is provided with a number of potential utilities either as porous or homogeneous materials, and, accordingly, a few fields of application are outlined by way of example in the following. The possiblity of leaving the water present in the hardened mixtures either as a required constituent of the foam, or of protecting the foam against the elimination of water by suitably coating or covering the foam with a water impermeable layer, or by removing all or some of the water by suitable drying techniques, for example, in a heating cabinet, or oven hot air, infrared heating, ultra-sonic heating or high-frequency heating, can be selected from case to case to suit the particular requirements of application.

The reaction mixture containing the blowing agent can be coated for example, onto any given warm, cold or even IR- or HF-irradiated substrates, or after passing through the mixer, can be sprayed with compressed air or even by the airless process onto these substrates on which it can foam and harden to give a filling or insulating coating. The foaming reaction mixture can also be molded, cast or injection-molded in cold or heated molds and allowed to harden in these molds, whether relief or solid or hollow molds, if desired by centrifugal casting at room temperature or temperatures of up to 200° C and if desired under pressure. In this respect, it is quite possible to use strengthening elements, whether in the form of inorganic and/or organic or metallic wires, fibers, webs, foams, woven fabrics, skeletons, etc. This can be done for example, by the fiber-mat impregnating process or by processes in which reaction mixtures and strengthening fibers are applied together to the mold, for example, by means of a spray unit. The moldings obtainable in this way can be used as structural elements, for example, in the form of optionally foamed sandwich elements produced either directly or subsequently by lamination with metal, glass, plastics, etc., in which case the favorable flame behavior of the foams in their moist or dry foam is of particular advantage. However, they can also be used as hollow bodies, for example, as containers for products that may have to be kept moist or cool, as filter materials or exchangers, as supports for catalysts or active substances, as decorative elements, as parts of furniture and as cavity fillings. They can also be used as high-stress lubricants and coolants or as carriers therefor, for example, in the extrusion of metals. They can also be used in the field of pattern and mold design, and also in the production of molds for casting metals.

In one preferred procedure, foaming is directly accompanied by hardening, for example, by preparing the reaction mixture in a mixing chamber and simultaneously adding the readily volatile blowing agent, for example, dichlorodifluoromethane, trichlorofluoromethane, butane, isobutylene or vinyl chloride, so that, providing it has a suitable temperature, ture, the reaction mixture issuing from the mixing chamber simultaneously foams through evaporation of the blowing agent and hardens to its final foam form under the effect of the organic polyisocyanate, said foam optionally containing emulsifiers, foam stabilizers and other additives. In addition, the initially still thinly liquid reaction mixture can be expanded into a foam by the introduction of gases optionally under pressure such as air, methane, $CF_4$, noble gases, the resulting foam being introduced into the required mold and hardened therein. Similarly, the silicate- or organic polyisocyanate solution optionally containing foam stabilizers such as surfactants, foam formers, emulsifiers and, optionally, other organic or inorganic fillers or diluents, may initially be converted by blowing gas into a foam and the resulting foam subsequently mixed in the mixer with the other components and optionally with the hardener and the resulting mixture allowed to harden.

In one preferred procedure, a solution of the organic polyisocyanate in liquid expanding or blowing agent is mixed with the optionally preheated aqueous alkali silicate solution and thus hardened while foaming.

Instead of blowing agents, it is also possible to use inorganic or organic finely divided hollow bodies such as expanded hollow beads of glass or plastics, straw and the like, for producing foams.

The foams obtainable in this way can be used either in their dry or moist form, if desired after a compacting or tempering process, optionally carried out under pressure, as insulating materials, cavity fillings, packaging materials, building materials with outstanding resistance to solvents and favorable flame behavior. They can also be used as lightweight bricks or in the form of sandwhich elements, for example, with metal covering layers, in house, vehicle and aircraft construction.

The reaction mixtures can also be dispersed in the form of droplets, for example, in petrol, or foamed and hardened during a free fall or the like, resulting in the formation of foam beads.

It is also possible to introduce into the foaming reaction mixtures, providing they are still free-flowing, organic and/or inorganic foamable or already foamed particles, for example, expanded clay, expanded glass, wood, popcorn, cork, hollow beads of plastics, for example, vinyl chloride polymers, polyethylene, styrene polymers or foam particles thereof or even, for example, polysulphone, polyepoxide, polyurethane, ureaformaldehyde, phenol formaldehyde, polyimide polymers, or to allow the reaction mixtures to foam through interstitial spaced in packed volumes of these particles, and in this way to produce insulating materials which are distinguished by excellent flame behavior. Combinations of expanded clay, glass, or slate with the reaction mixtures according to the invention, are especially preferred.

When a mixture of aqueous silicate solutions optionally containing inorganic and/or organic additives and the organic polyisocyanates has simultaneously added to it at a predetermined temperature the blowing agent which is capable of evaporation or of gas formation at these temperatures, for example a (halogenated) hydrocarbon, the initially liquid mixture formed can be used not only for producing uniform foams or non-uniform foams containing foamed or unfoamed fillers, it can also be used to foam through any given webs, woven fabrics, lattices, structural elements or other permeable structures of foamed materials, resulting in the formation of composite foams with special properties, for example, favorable flame behavior, which may optionally be directly used as structural elements in the building, furniture or vehicle and aircraft industries.

The foams according to the invention can be added to soil in the form of crumbs, optionally in admixture with fertilizers and plant-protection agents, in order to improve its agrarian consistency. Foams of high water content can be used as substrates for propagating seedlings, cuttings and plants or cut flowers. By spraying the mixtures onto impassable or loose terrain, for example, sand dunes or marshes, it is possible to obtain effective consolidation which soon becomes passable and offers protection against erosion.

It is also advantageous to spray the proposed reaction mixtures onto an article to be protected in the event of fire or accident, the water present being unable to run down or prematurely evaporate on the surface of the structure to be protected, so that particularly effective protection against fire, heat or radiation is obtained because the hardened mixture, providing it still contains water, cannot be heated to temperatures appreciably above 100° C and it also adsorbs IR or nuclear radiation.

By virtue of their favorable spray properties, the mixtures can form effective protective walls and protective layers in the event of mining accidents and also in routine work, for example, by spraying them onto woven fabrics, other surfaces, latticies or even only onto walls. One particular advantage in this respect is that hardening is quickly obtained.

Similarly, the foaming mixtures can be used in construction engineering, in civil engineering and road building for erecting walls, igloos, seals for filling joints, plastering, flooring, insulation, decoration and as a coating, screed and covering material. They can also be considered for use as adhesives or mortars or as casting compositions, optionally filled with inorganic or organic fillers.

Since the hardened foams obtained by the process according to the invention can show considerable porosity after drying, they are suitable for use as drying agents because they can absorb water. However, they can also be charged with active substances or used as catalyst supports or filters and absorbents.

Auxiliaries which may if desired, be used in or subsequently introduced into the reaction mixture, such as emulsifiers, surfactants, dispersants, ordorants, hydrophobizing substances, enable the property spectrum of the foams in their moist or dry form to be modified as required.

On the other hand, the foams can be subsequently lacquered, metallized, coated, laminated galvanized, subjected to vapor deposition, bonded or flocked in their moist or dry form or in impegnated form. The moldings can be further processed in their moist or dried form, for example, by sawing, milling, drilling, planing, polishing and other machining techniques.

The optionally filled moldings can be further modified in their properties by thermal aftertreatment, oxidation processes, hot-pressing, sintering processes or surface melting or other consolidation processes.

Suitable mold materials include inorganic and/or organic foamed or unfoamed materials such as metals, for example, iron, nickel, fine steel, lacquered or, for example, tefloncoated aluminum, poreclain, glass, wood, plastics such as PVC, polyethylene, epoxide resins, ABS, polycarbonate, etc.

The foams obtainable in accordance with the invention can be surface-treated or, where they are in the form of substantially permeable structures, for example, substantially open-cell foams or porous materials, can even be treated by centrifuging, vacuum treatment, blowing air through or by rinsing with (optionally heated) liquids or gases which remove the water present, such as methanol, ethanol, acetone, dioxan, benzene, chloroform and the like, or dried with air, $CO_2$, or super heated steam. Similarly, the moist or dry moldings can also be aftertreated by rinsing or impregnating with aqueous or non-aqueous acid, neutral or basic liquids or gases, for example, hydrochloric acid, phosphoric acid, formic acid, acetic acid, ammonia, amines, organic or inorganic salt solutions, lacquer solutions, solutions of polymerizable or already polymerized monomers, dye solutions, galvanizing baths, solutions of catalysts or catalyst preliminary stages, odorants and the like.

The new composite materials are particularly suitable for use as structural materials because they show tensile and compressive strength, are tough, rigid and at the same time elastic, show high permanent dimensional stability when hot and are substantially non-inflammable.

The excellent heat insulating and sound insulating capacity of these foams should also be mentioned which, together with their excellent fire resistance and heat resistance, opens up possibilities for their uses for insulating purposes.

Thus, it is possible, for example, to produce high quality lightweight structural panels either by continuously cutting or sawing foamed blocks into corresponding panels or by foaming panels of this kind and, in particular, complicated moldings in molds, optionally under pressure. It is also possible by adopting a suitable procedure to produce molding with an impervious outer skin.

When a technique of foaming in the mold under pressure is employed, molded parts with dense marginal zones and completely non-porous smooth surfaces can be obtained.

However, the process according to the invention is particularly suitable for in situ foaming on the building site. Thus, any types of hollow mold, of the kind made by formwork in the usual way, can be cast or filled with foam.

The reaction mixture can also be used to fill cavities, gaps, cracks, giving a very firm bond between the joined materials. Insulating internal plasters can also be readily produced by spraying on the reaction mixture.

In many cases, the materials obtained can be used instead of wood or hard-fiber boards. They can be sawed, rubbed down, planed, nailed, drilled, milled and in this way, can be worked and used in a number of different ways.

Very brittle lightweight foams of the kind which can be obtained for example, by having a very high silicate content or by combination with equally brittle organic polymers, can readily be converted by crushing in suitable machines into dustfine powders which can be used for a number of different purposes as organically-modified silica fillers. Organic-modification provides effective surface interaction with polymers and, in some cases, also a certain degree of surface thermoplasticity which makes it possible to produce high quality molding compositions on which topochemical surface reaction can be carried out by the addition of crosslinking agents.

Fillers in the form of particulate or powdered materials can be additionally incorporated into the mixtures of organic polyisocyanates and alkali silicates for a number of applications.

Suitable fillers include solid inorganic or organic substances, for example, in the form of powders, granulate, wire, fibers, dumb bells, crystallites, spirals, rods, beads, hollow beads, foam particles, webs, pieces of woven fabric, knit fabrics, ribbons, pieces of film, etc., for example, of dolomite, chalk, alumina, asbestos, basic silicas, sand, talcum, iron oxide, aluminum oxide and oxide hydrate, zeolites, calcium silicates, basalt wool or powder, glass fibers, C-fibers, graphite, carbon black, Al-, Fe-, Cu-, Ag- powder, molybdenum sulphite, steel wool, bronze or copper cloth, silicon powder, expanded clay particles, hollow glass beads, glass powder, lava and pumice particles, wood chips, sawdust, cork, cotton, straw, jute, sisal, hemp, flax, rayon, popcorn, coke, particles of filled or unfilled, foamed or unfoamed, stretched or unstretched organic polymers including plastics and rubber waste. Of the number of suitable organic polymers, the following, which can be present for example, in the form of powders, granulate, foam particles, beads, hollow beads, foamable or unfoamed particles, fibers, ribbons, woven fabrics, webs, etc., are mentioned purely by way of example: polystyrene, polyethylene, polypropylene, polyacrylonitrile, polybutadiene, polyisoprene, polytetrafluoroethylene, aliphatic and aromatic polyesters, melamine-urea or phenol resins, polyacetal resins, polyepoxides, polyhydantoins, polyureas, polyethers, polyurethanes, polyimides, polyamides, polysulphones, polycarbonates, and, of course, any copolymers as well. Inorganic fillers are preferred.

Generally, the composite materials according to the invention can be filled with considerable quantities of fillers without losing their valuable property spectrum. The amount of fillers can exceed the amount of the components (a), (b) and (c). In special cases the inorganic-organic composition of the present invention acts as a binder for such fillers.

In cases where higher amounts of fillers are used it may be advisable to add water in order to obtain sufficient working properties, coarse fillers can be used in wet form, powdered fillers such as e.g. chalk, alumina, dolomite, calcium hydroxide, magnesium carbonate, calcium carbonate can be used also as an aqueous suspension.

Products of low silicate content are particularly suitable for the production of quick-hardening high quality surface coating which show outstanding adhesion and resistance to abrasion, and for the production of elastomers of high strength and high modulus.

For applications such as these, it is preferred to use isocyanato-prepolymer ionomers of low isocyanate content, for example, less than 5% or even prepolymers which have masked isocyanate groups. It is possible in this way to obtain mixtures with long pot life which can also be applied in the form of thin layers gradually hardening with time.

If only a small amount of $CO_2$ is liberated (by correct adjustment of proportions and activity) a pasty or doughy plastic material which can be formed in any way is obtained with partial hardening, which is accompanied by an increase in viscosity. This material can be formed and hardened at a later stage, for example, by drying in air or by heating.

Such a two-stage or multi-stage hardening process is of particular interest so far as processing as a putty, trowelling composition, gap-filling compound, mortar and the like, is concerned. In the first stage of this hardening process, for example, there is a rapid evolution of $CO_2$ (for example by the reaction of NCO-groups with water) which converts the inorganic/organic composite material into a plastic or thermoplastic processible form, hardening taking place in a second, slower hardening stage, for example, through the hydrolysis of a high molecular weight or low molecular weight ester.

The thermoplastic intermediate stage can also be processed by injection molding, extrusion or kneading.

In many cases, these intermediate stages can also be mixed with water, organic solvents, plasticizers, extending agents, fillers and thus modified and applied in a number of different ways.

The materials according to the invention are also suitable for use as impregnating agents for finishing fibers, for which purpose it is possible both to use completed mixtures of the organic and of the silicate component, and to apply a two-bath treatment. Accordingly, the component with the better adhesion, i.e. the prepolymer component, is preferably initially applied to organic material, and the silicate component to inorganic material.

In addition, it is possible, for example by extruding the mixtures through dies or slots, to produce fibers and films which can be used for example, for the production of synthetic non-inflammable paper or for the production of webs.

The foam material according to the invention is capable either of absorbing water and/or water vapor or of affording considerable resistance to the eiffusion of water and/or water vapor, depending on the composition and structure of the material.

The foam material according to the invention opens up new possibilities in the fields of underground and surface engineering and in the production of finished parts and elements.

The following are mentioned as examples of the possibilities of application: the manufacture of wall cements, for prefabricated buildings, sand molds, roller shutter castings, window-sills, railroad and underground sleepers, curbstones, stairs, the filling of joints by foaming and the backfilling of ceramic tiles by foaming.

The foam material may also advantageously be used for binding gravel and marble chips, etc; decorative panels can be obtained in this way which can be used, for example, as facades.

The invention will now be described in more detail with the aid of examples.

EXAMPLES

Preparation of the nonionic-hydrophilic prepolymers
Starting materials:

I. Polyisocyanate component: Diisocyanatodiphenylmethane is distilled from a crude phosgenation product of an aniline/formaldehyde condensate until the distillation residue has a viscosity at 25° C of 400 cP. (Dinuclear content: 45.1% by weight, trinuclear content: 22.3% by weight, content in higher nuclear polyisocyanates: 32.6% by weight) NCO content: 30% to 31% by weight.

II. Nonionic-hydrophilic component:
P 1. Polyethylene oxide monohydric alcohol, molecular weight 1145, initiated on n-butaneol
P 2. Polyethylene oxide monohydric alcohol, molecular weight 782, initiated on n-butanol
P 3. Polyethylene oxide monohydric alcohol, molecular weight 1432, initiated on n-butanol
P 4. Polyethylene oxide monohydric alcohol, molecular weight 1978, initiated on n-butanol
P 5. Polyethylene oxide glycol, molecular weight 614, initiated on propylene glycol
P 6. Polyethylene oxide trihydric alcohol, molecular weight 680, initiated on trimethylol propane
P 7. Polyethylene oxide trihydric alcohol, molecular weight 300, initiated on trimethylol propane.
P 8. Polypropylene oxide polyethylene oxide glycol, molecular weight 4,000, initiated on propylene glycol.

Experimental Procedure:

Polyisocyanate component (I) and nonionic-hydrophilic polyether component (II) are combined and reacted together at 80° C with stirring until a homogeneous prepolymer with constant NCO content is obtained.

Prepolymers of this kind are completely stable for many months at room temperature and undergo practically no change in their NCO content.

| Pre-poly-mer | I | II | | Reaction time (h) | NCO (% by weight) | Viscosity cP/25° C |
|---|---|---|---|---|---|---|
| O | 500 g | 50 g | P 1 | 1 | 27.1 | 650 |
| A | 80 kg | 16 kg | P 1 | 8 | 24.6 | 1300 |
| B | 500 g | 250 g | P 1 | 1 | 18.7 | 12,000 |
| C | 500 g | 500 g | P 1 | 1 | 12.8 | 15,000 |
| D | 500 g | 1000 g | P 1 | 1 | — | solid |
| E | 500 g | 50 g | P 2 | 1 | 27.1 | 650 |
| F | 500 g | 100 g | P 2 | 1 | 23.5 | 700 |
| G | 500 g | 50 g | P 3 | 1 | 24.9 | 700 |
| H | 500 g | 50 g | P 4 | 1 | 27.5 | 300 |
| I | 500 g | 50 g | P 5 | 1 | 26.4 | 400 |
| J | 500 g | 50 g | P 6 | 1 | 26.1 | 5000 |
| K | 500 g | 100 g | P 6 | 1 | 24.1 | 15,000 |

-continued

| Pre-polymer | I | II | Reaction time (h) | NCO (% by weight) | Viscosity cP/25° C |
|---|---|---|---|---|---|
| L | 500 g | 250 g P 6 | 1 | — | solid |
| M | 500 g | 50 g P 7 | 1 | 23.5 | 300 |
| N | 500 g | 100g P 8 | 1 | 25.7 | 1200 |

EXAMPLE 1

450 g of Prepolymer A
60 g of trichlorofluoromethane
450 g of sodium waterglass (44% solids, molecular weight ratio $Na_2O : SiO_2 = 1:2$)
5 g of amine catalyst (consisting of 75% by weight of N,N-dimethylaminoethanol and 25% by weight of diazabicyclooctane)
4 g of stabilizer (polyether polysiloxane of Example 1 of U.S. Pat. No. 3,629,390, Column 12, lines 6–13).

The mixture of waterglass, amine catalyst and foam stabilizer are added to the nonionic-hydrophilic prepolymer A which has been diluted with trichlorofluoromethane. The whole reaction mixture is then vigorously mixed for 15 seconds, using a high speed stirrer, and then poured out into paper packets. The foaming process begins after 28 seconds and is completed after 40 seconds. The temperature of the reaction mixture increases during the expanding process and continues after the foaming mass has solidified, reaching a temperature of about 80° C. A tough, finely porous foam with a regular cell structure is obtained. Initially, the foam contains water but on drying it loses about 10% by weight without undergoing any dimensional change. Samples may be removed from the foam and the properties determined after 3 hours' tempering at 120° C.

| | |
|---|---|
| Density: | 15 kg/m³ |
| Compression strength: | 0.22 kp/cm² |
| Change in Volume (5 h/180° C) | 0% |
| Proportion of open cells: | 97% |
| Coefficient of thermal conductivity | 0.035 kcal/m/h/degrees |
| Combustibility according to ASTM D 1692-68 | SE (self extinguishing) |
| Resistance to bending in the heat: | 119° C |

EXAMPLE 2

450 g of prepolymer A
60 g of trichlorofluoromethane
60 g of red phosphorus (powder)
450 g of waterglass according to Example 1
5 g of amine catalyst according to Example 1
1.5 g of stabilizer according to Example 1

The procedure is the same as in Example 1 except that the red phosphorus is first emulsified in the solution of prepolymer A in trichlorofluoromethane. The reaction mixture is vigorously stirred for 15 seconds and then poured out. It begins to foam after 22 seconds and solidifies after 56 seconds.

Samples may be removed from the resulting finely porous foams and the following properties determined after 3 hours' drying at 120° C:

| | |
|---|---|
| Density: | 18 kg/cm³ |
| Compression strength: | 0.23 kp/cm² |
| Change in Volume (5 h/180° C) | 0% |

| | |
|---|---|
| Combustibility according to ASTM D 1692-68 | SE (self extinguishing) |
| Small burner test according to DIN provisional standard 53 438 | K 1 (62 mm) / F 1 (97 mm) (normally combustible) |

EXAMPLE 3

| | |
|---|---|
| 450 g of Prepolymer A<br>60 g of chlorinated paraffin mixture<br>1.5 g of stabilizer according to Example 1<br>100 g of trichlorofluoromethane | Component I |
| 450 g of waterglass according to Example 1<br>5 g of amine catalyst according to Example 1<br>120 g of calcium hydrogen phosphate | Component II |

Each component is vigorously stirred to mix its constituents before the experiment and the two components are then stirred together for 15 seconds and the resulting mixture poured out into a paper packet. The foaming process begins after 27 seconds and is completed after 80 seconds. The resulting tough, finely porous foam is found to have a regular pore structure and after drying (3 hours at 120° C) has a density of 19.1 kg/m³. This inorganic-organic foam is self-extinguishing according to ASTM D 1692-68 and in the samm burner test according to DIN provisional standard 53 438 it is normally combustible.

EXAMPLE 4

| | |
|---|---|
| 100 g of Prepolymer A<br>20 g of trichloromethane | Component I |
| 150 g of waterglass according to Example 1<br>1.5 g of triethylamine<br>0.2 g of emulsifier, the sodium salt of a sulphochlorinated paraffin mixture $C_{10}$–$C_{14}$ | Component II |

Each of the two components is vigorously mixed on its own and the two components are then vigorously stirred together with a high speed stirrer for 15 seconds and the resulting mixture is poured out into a paper packet. The reaction mixture begins to foam after 36 seconds and solidifies after 30 seconds.

The resulting tough, elastic, inorganic-organic foam had a fine, regular pore structure and without drying has a density of 50 kg/m³.

EXAMPLE 5

| | |
|---|---|
| 100 g of Prepolymer B<br>20 g of trichlorofluoromethane | Component I |

150 g of waterglass according to Example 1
1.5 g of triethylamine
0.2 g of emulsifier according to Example 1

The inorganic-organic foam is produced according to the process of Example 4. It is a tough, elastic product which is finely porous with a regular cell structure and without drying it has a density of 45 kg/m³.

EXAMPLE 6

| | |
|---|---|
| 100 g of Prepolymer O | Component I |
| 20 g of trichlorofluoromethane | |
| 150 g of waterglass according to Example 1 | |
| 2.0 g of N,N',N''-(ω-dimethylamino-n-propyl) hexahydrotriazine | Component II |
| 2.0 g of stabilizer (polyether polysiloxane) of Example 1 | |

The foam is produced by the process of Example 4. A tough, elastic, finely porous inorganic-organic foam which had a density of 20 kg/m³ without drying is obtained.

EXAMPLE 7

| | |
|---|---|
| 450 g of Prepolymer A | Component I |
| 4 g of stabilizer according to Example 1 | |
| 150 g of waterglass according to Example 1 | Component II |
| 4 g of amine catalyst according to Example 1 | |

Production of the inorganic-organic foam from components I and II is carried out as in Example 1.

A finely porous, tough, lightweight foam blown up with carbon dioxide is obtained. It has a regular cell structure and without drying has a density of 26.4 kg/m³.

The fire characteristics are inferior to those of foams which are been blown up with trichlorofluoromethane.

EXAMPLE 8

| | |
|---|---|
| 450 g of Prepolymer A | Component I |
| 4 g of stabilizer according to Example 1 | |
| 450 g of waterglass according to Example 1 | Component II |
| 4 g of amine catalyst according to Example 1 | |

Mixing of the components is carried out as in Example 7. The material obtained is only slightly foamed and has a plastic consistency. When hardened by heat or prolonged storage it solidifies to a rock hard, elastic mass.

EXAMPLE 9

| | |
|---|---|
| 450 g of Prepolymer A | |
| 4 g of stabilizer according to Example 1 | Component I |
| 80 g of trichlorofluoromethane | |
| 200 g of quick setting cement | |
| 450 g of waterglass according to Example 1 | Component II |
| 3 g of amine catalyst according to Example 1 | |

Each of the two components is first vigorously stirred to mix its constituents and the two components are then mixed together for 15 seconds with the aid of a high speed stirrer and the resulting mixture is poured into a sample packet. The reaction mixture begins to foam after 29 seconds and is solidified after 180 seconds. A finely porous foam with a density of 28.6 kg/m³ is obtained.

EXAMPLE 10

| | |
|---|---|
| 450 g of Prepolymer A | |
| 4 g of stabilizer according to Example 1 | Component I |
| 80 g of trichlorofluoromethane | |
| 200 g of quick setting cement | |
| 450 g of waterglass according to Example 1 | Component II |
| 3 g of amine catalyst according to Example 1 | |
| 200 g of quick setting cement | |

The inorganic-organic foam is produced from components I and II as described in Example 9. The stirring time is 15 seconds. The reaction mixture begins to foam after 30 seconds and is solidified after 250 seconds.

The finely porous foam had a density of 42.8 kg/m³ without drying.

EXAMPLE 11

| | |
|---|---|
| 450 g Prepolymer A | |
| 60 g of trichlorofluoromethane | Component I |
| 4 g of stabilizer according to Example 1 | |
| 450 g of waterglass according to Example 1 | |
| 4 g of amine catalyst according to Example 1 | Component II |
| 10 g of vermiculite | |

Each of the two components I and II is first vigorously stirred on its own to mix its constituents and the two components are then vigorously mixed together. A foam with a density of 31 kg/m³ in which the vermiculite is uniformly distributed is obtained after foaming and hardening.

EXAMPLE 12

A mixture of 450 parts by weight of waterglass according to Example 1 and 1 part by weight of amine catalyst according to Example 1 is introduced into a pressure vessel having a stirrer on the polyol side of a commercial type H 100 K (Maschinenfabrik Hennecke GmbH) foaming machine of the kind conventionally used for producing polyurethane foams. A mixture of 450 parts by weight of prepolymer A, 4 parts by weight of stabilizer according to Example 1 and 150 parts by weight of trichlorofluoromethane is introduced into a pressure vessel having a stirrer on the isocyanate side.

The output rate is adjusted to 6050 g/min on the polyol side and 8040 g/min on the isocyanate side. The components are mechanically mixed in the HK mixing head by the known technique employed for polyurethane rigid foam.

The resulting reaction mixture begins to foam after 3 seconds and solidifies after 146 seconds with evolution of heat.

Foam blocks measuring 60 × 60 × 60 cm³ which have an average density of 17 kg/m³ are produced by this method. The tough-elastic inorganic-organic foam has a regular fine cell structure and is dimensionally unaltered even after 5 hours at 180° C.

It is to be understood that the foregoing Examples are given for the purpose of illustration and that any other suitable polyisocyanate, polyol, alkali metal silicate or the like can be substituted therein provided the teachings of this disclosure are followed.

It is to be understood that any of the components and conditions mentioned as suitable herein can be substituted for its counterpart in the foregoing examples and that although the invention has been described in considerable detail in the foregoing, such detail is solely for the purpose of illustration. Variations can be made in the invention by those skilled in the art without departing from the spirit and scope of the invention except as it may be limited by the claims.

What is claimed is:

1. An inorganic-organic composition obtained by reacting a mixture of
   A. from 5-98% by weight of an organic, non-ionic-hydrophilic polyisocyanate prepared by reacting an excess of an organic polyisocyanate with an organic hydrophilic compound containing at least one group which is reactive with isocyanate groups, and
   B. from 2-95% by weight of an aqueous alkali metal silicate solution containing about 20-70% by weight of alkali metal silicate based on the weight of said aqueous solution, the percents by weight of (A) and (B) based on the total weight of (A) and (B), said composition being a solid/solid xerosol.

2. The composition of claim 1, wherein said organic hydrphilic compound is selected from the group consisting of hydrophilic polyethers, aliphatic polycarbonates, hydrophilic polyesters, and mixtures thereof.

3. The composition of claim 1, wherein the non-ionic-hydrophilic polyisocyanate is prepared by at least partially reacting an organic polyisocyanate with a polyether which contains at least 10% by weight of ethylene oxide.

4. The composition of claim 1, wherein the aqueous silicate solution contains 32-54% by weight silicate and the ratio by weight of polyisocyanate to silicate is from 70:30 to 20:80.

5. The composition of claim 1, wherein an inert liquid boiling at temperatures from $-25°$ C to $+50°$ C is included in the reaction mixture as a blowing agent in a quantity of up to 50% by weight and the reaction mixture is allowed to react to completion while foaming.

6. The composition of claim 1 in which the average transverse diameter of the dispersed phase is between 20 nm and 2 microns.

7. The composition of claim 6 wherein the said avererage diameter is between 50 nm and 700 nm.

8. The composition of claim 6, wherein both phases are coherent.

9. The compostion of claim 6, which contains an inorganic or organic particulate or powdered filler material.

10. The composition of claim 6, which contains glass fibers.

11. The composition of claim 1, wherein said composition is based on:
    A. 10-80% by weight of said organic polyisocyanate, and
    B. 20-90% by weight of said aqueous alkali metal silicate solution.

12. The composition of claim 11 wherein the reaction mixture contains a foam stabilizer.

13. The composition of claim 11 wherein the reaction mixture contains an emulsifier agent.

14. The composition of claim 11, wherein the mixture contains an inert inorganic particulate or fibrous filler material.

15. The composition of claim 11, wherein the mixture contains an inert organic particulate or fibrous filler material.

16. The composition of claim 11, wherein the mixture contains an organic compound containing hydrogen atoms which are reactive with isocyanate groups.

17. The composition of claim 11, wherein the alkali metal silicate is sodium silicate in which the molar ratio of $Na_2O:SiO_2$ is within the range of 1:1.6 and 1:3.3.

18. The composition of claim 11, wherein said composition is based on.
    A. 10-50% by weight of said organic polyisocyanate, and
    B. 50-90% by weight of said alkali metal silicate solution.

19. The composition of claim 11, wherein said composition is based on:
    A. 20-50% by weight of said organic polyisocyanate, and
    B. 50-80% by weight of said alkali metal silicate solution.

20. The foamed composition of claim 11, wherein the mixture contains a blowing agent.

21. The foamed composition of claim 20, wherein the blowing agent is a halogenated hydrocarbon with a boiling point below 100° C.

22. The compositon of claim 11, wherein the mixture contains an activator which accelerates the reaction of isocyanate groups with water.

23. The composition of claim 22, wherein the activator is a tertiary amine.

24. The composition of claim 11, wherein the mixture contains an inorganic water binding component, said water binding component being capable of absorbing water to form a solid or gel.

25. The composition of claim 24, wherein the water binding component is a hydraulic cement, synthetic anhydride, gypsum or burnt lime.

26. A process for producing an inorganic-organic composition, said composition being a solid/solid xerosol, said process comprising reacting:
    A. from 5-98% by weight of an organic, non-ionic-hydrophilic polyisocyanate prepared by reacting an excess of an organic polyisocyanate with an organic hydrophilic compound containing at least one group which is reactive with isocyanate groups, and
    B. from 2-95% by weight of an aqueous alkali metal silicate solution containing about 20-70% by weight of an alkali metal silicate based on the weight of said aqueous solution, the percents by weight of (A) and (B) based on a total weight of (A) and (B).

27. The process of claim 26, wherein said organic hydrophilic compound is selected from the group consisting of hydrophilic polyethers, aliphatic polycarbonates, hydrophilic polyesters, and mixtures thereof.

* * * * *